United States Patent [19]

Lee

[11] 4,316,771
[45] Feb. 23, 1982

[54] NUCLEAR FUEL STRESS CORROSION PREVENTION

[75] Inventor: Harvey R. Lee, Omemee, Canada

[73] Assignee: Canadian General Electric Company Limited, Toronto, Canada

[21] Appl. No.: 77,045

[22] Filed: Sep. 19, 1979

Related U.S. Application Data

[63] Continuation of Ser. No. 870,076, Jan. 17, 1978, abandoned.

[51] Int. Cl.³ ............................................... G21C 3/20
[52] U.S. Cl. ...................................... 376/415; 376/417
[58] Field of Search .................. 176/82, 68, 67, 71, 176/72, 91 SP, 88

[56] References Cited

U.S. PATENT DOCUMENTS

| | | | |
|---|---|---|---|
| 3,085,059 | 4/1963 | Burnham, Jr. | 176/82 |
| 3,119,747 | 1/1964 | Wallace et al. | 176/82 |
| 3,230,150 | 1/1966 | Martin et al. | 176/82 |
| 3,354,043 | 11/1967 | Boettcher | 176/82 |
| 3,901,761 | 8/1975 | Wood | 176/82 |
| 3,925,151 | 12/1975 | Klepfor | 176/82 |
| 4,045,288 | 8/1977 | Armijo | 176/82 |
| 4,131,511 | 12/1978 | Mordarski et al. | 176/78 |
| 4,200,492 | 4/1980 | Armijo et al. | 176/82 |

FOREIGN PATENT DOCUMENTS

| | | | |
|---|---|---|---|
| 1004781 | 8/1973 | Canada | 176/82 |
| 2155518 | 5/1973 | Fed. Rep. of Germany | 176/82 |
| 854122 | 11/1960 | United Kingdom | 176/82 |
| 1052166 | 12/1966 | United Kingdom | 176/82 |
| 1055076 | 1/1967 | United Kingdom | 176/82 |
| 1063631 | 3/1967 | United Kingdom | 176/82 |

OTHER PUBLICATIONS

Nature, vol. 265, 1/77, pp. 36, 37, Grubb.

*Primary Examiner*—Harvey E. Behrend
*Attorney, Agent, or Firm*—Ivor J. James, Jr.; Raymond G. Simkins; Samuel E. Turner

[57] ABSTRACT

Nuclear fuel for use in nuclear reactors is provided in the form of a nuclear fuel element with an interior barrier layer interposed between the sheath and the fuel. The barrier layer incorporates particles of copper in finely divided form to provide by combination with cadmium, which is released during irradiation of the fuel, a stabilized copper-cadmium compound localized intermediate the fuel and the sheath, thus impeding attack on the sheath by the released cadmium. There is further provided a simple, low cost method for applying the barrier layer in a nuclear fuel element.

12 Claims, 2 Drawing Figures

NUCLEAR FUEL STRESS CORROSION PREVENTION

CROSS REFERENCE TO RELATED APPLICATION

This is a continuation of application Ser. No. 870,076, filed Jan. 17, 1978 now abandoned.

BACKGROUND OF THE INVENTION

This invention is directed to a nuclear fuel system and in particular to nuclear fuel rods incorporating a protective intermediate layer between the fuel and its zirconium alloy sheath (cladding), and a method for applying the layer in a nuclear fuel element.

In the operation of nuclear reactors employing sintered fuel tablets (pellets) sheathed in zirconium alloy sheaths, it has been found that, during irradiation, cadmium is released from the fuel and migrates outwardly to the inner surface of the sheath where it can create an embrittlement phenomenon, resulting in sheath failure due to stress corrosion cracking.

SUMMARY OF THE INVENTION

In accordance with the present disclosure, copper is provided as a barrier or partial barrier between the fuel and the sheath inner surface, to facilitate the formation of a stable copper-cadmium alloy during the irradiation life of the fuel. This barrier thereby impedes the formation of a concentration of cadmium or active compounds thereof on the inner surface of the sheath.

Thus, there is provided a fuel element comprising a sheath of zirconium alloy containing therein nuclear fuel material in pellet form of the type which releases cadmium during extended irradiation and an intermediate barrier layer between the outer surface of the fuel and the inner surface of the sheath, which layer includes particles of copper in finely divided form. In use within a reactor under conditions of irradiation, cadmium released from the fuel can combine at least in part with the copper to provide a stabilized copper-cadmium compound substantially localized intermediate the fuel and the sheath. This impedes the alloying or other reaction of the cadmium with the material of the sheath.

This arrangement is of particular use with enriched or natural uranium fuels such as uranium dioxide ($UO_2$) fuels.

The barrier layer incorporating the finely divided copper, generally less than 5 microns in size, may include graphite, silicon or a cross-linked, baked siloxane lacquer, and is generally applied in the form of a coating or a layer internally of the fuel sheath, before insertion of the fuel therein.

As an alternative to providing the finely divided copper as a constituent uniformly dispersed with the other components of the barrier layer, it is further contemplated that a copper layer may be provided as a surface interposed between the pellets and the sheath by a process involving the deposition of a copper slurry on the desired surface, using appropriate carrier liquids and drying techniques to achieve the desired copper concentration, at very low cost as compared with electrolytic processes, which are well known.

Thus, there is provided the method of applying a coating including or comprising finely divided copper, comprising the steps of providing at least one immersion of the surface to be coated with a slurry including a liquid carrier and the finely divided copper, maintaining the immersion for a predetermined time or cumulation of times, draining excess slurry from the surface, and drying the surface.

DESCRIPTION OF THE DRAWINGS

Certain embodiments of the invention are described, reference being made to the accompanying drawings, wherein.

DETAILED DESCRIPTION OF THE INVENTION

Figure 1:
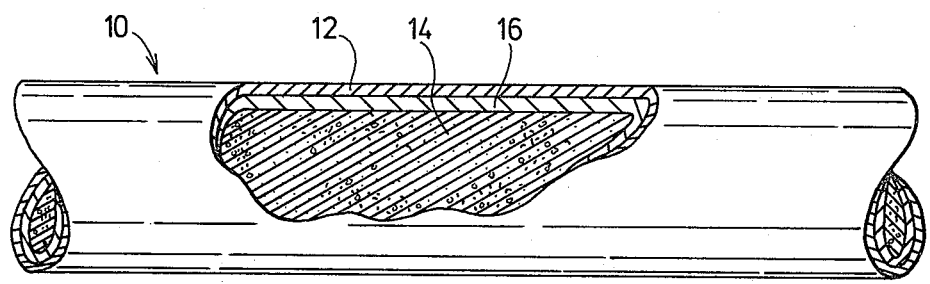
FIG. 1 is a view, partially in section, of a portion of a fuel rod embodying the present invention.

Referring to FIG. 1, the portion 10 of a fuel rod has a zirconium alloy sheath 12, such as a zirconium alloy containing tin, iron, chromium and nickel, referred to as "Zircaloy-2" (Trademark), and contains fuel material 14, such as pellets of $UO_2$. A layer 16 interposed between the sheath 12 and fuel material 14 includes finely divided copper. The quantity of copper is predicated on the constituents of the fuel and the potential extent of irradiation, so as to balance effectively substantially the capability to take up cadmium to the extent necessary to offset the propensity of the cadmium, in operation, to cause embrittlement of the sheath 12.

Thus, while an excess of copper for such purposes may well be utilized, it is contemplated in practice that, with operational experience and adequate quality control, the quantity of copper may be significantly reduced to an amount sufficient to maintain satisfactory operation and substantially prevent sheath failure. In one embodiment the copper can comprise up to about 50% by weight of layer 16. It is contemplated that at least about 1 milligram (mg) per square centimeter ($cm^2$) of copper is in the layer and preferably about 5 mg per $cm^2$, with the amount depending on the rate that the fuel releases cesium, iodine or both cesium and iodine combined.

Figure 2:
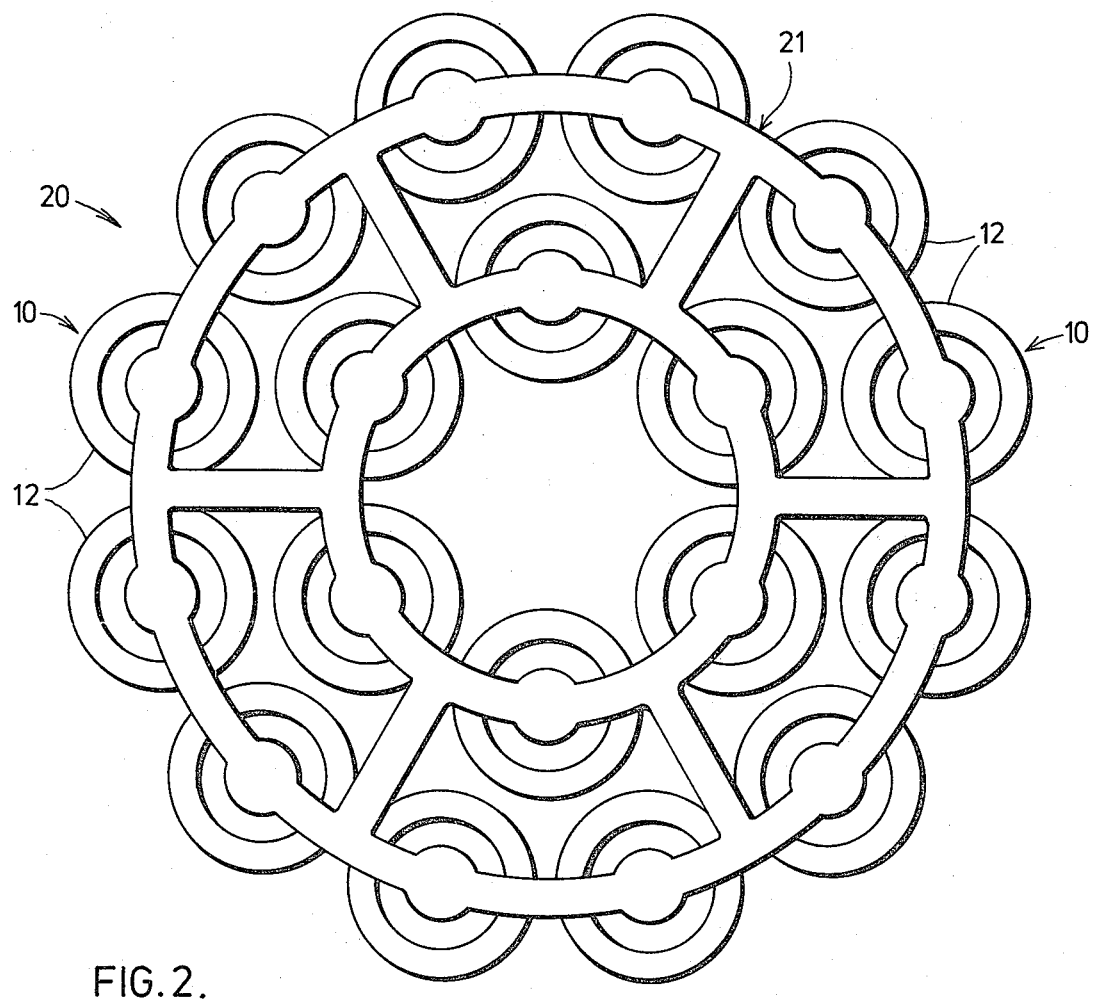
FIG. 2 is an end view of a fuel bundle incorporating the present invention.

Referring to FIG. 2, the fuel bundle 20 has a plurality of like fuel rods 10 illustrated as being mounted between end plates 21, of suitable shape and configuration.

While illustrated in relation to a fuel bundle of the type used for CANDU (Trademark) heavy water moderated, heavy water cooled reactors, the present invention is equally susceptible of use with other types of reactors, including light water reactors utilizing enriched fuel.

I claim:

1. A fuel element for water cooled nuclear reactors consisting essentially of a sheath of a zirconium alloy, containing uranium oxide nuclear fuel material therein, and having an intermediate barrier layer between and adjoining both the uranium oxide fuel and the zirconium alloy sheath, said layer including particles of copper in finely divided form of generally less than about 5 microns in size and in amount of at least about 1 milligram of copper per square centimeter whereby in use within a reactor under conditions of irradiation, cadmium released during irradiation from the fuel can combine with the copper to provide a stabilized copper-cadmium compound substantially localized intermediate the fuel and the sheath, thus impeding attack on the sheath by the released cadmium.

2. An element as in claim 1 wherein said nuclear fuel is a uranium fuel in pellet form.

3. An element as in claim 1 wherein said nuclear fuel is comprised of uranium dioxide.

4. An element as in claim 1 wherein said barrier layer is comprised of particles of copper dispersed in another material selected from the group consisting of graphite, silicon, cross-linked baked siloxane lacquer, and combinations thereof.

5. An element as in claim 4 in which the copper comprises up to about 50% by weight of such layer.

6. An element as in claim 1 in which said barrier layer is comprised of particles of copper dispersed in graphite.

7. An element as in claim 1 in which said barrier layer is comprised of particles of copper dispersed in silicon.

8. An element as in claim 1 in which said barrier layer is comprised of particles of copper dispersed in cross-linked baked siloxane lacquer.

9. An element as in claim 1 in which the sheath is comprised of a zirconium alloy containing tin, iron, chromium and nickel.

10. A method of protecting a zirconium alloy sheath of a cladding of a uranium oxide-containing nuclear fuel rod for water cooled nuclear reactors from reaction with cadmium, comprising applying inside the zirconium alloy sheath a layer comprising particles of copper of generally less than about 5 microns in size and in amount of at least about 1 milligram of copper per square centimeter dispersed in another material selected from the group consisting of graphite, silicon, cross-linked based siloxane lacquer, and combinations thereof, whereby said layer comprising particles of copper will adjoin the uranium-containing nuclear fuel when the sheath contains such fuel.

11. The fuel element of claim 1, wherein the particles of copper are in amount of about 5 milligrams per square centimeter.

12. The method of claim 10, wherein the particles of copper are in amount of about 5 milligrams per square centimeter.

* * * * *